United States Patent
Gopalan

(10) Patent No.: US 10,133,961 B2
(45) Date of Patent: *Nov. 20, 2018

(54) METHOD AND APPARATUS FOR ANALYZING MEDIA CONTENT

(71) Applicant: AT&T Intellectual Property I, L.P., Atlanta, GA (US)

(72) Inventor: Raghuraman Gopalan, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,999

(22) Filed: Jan. 4, 2018

(65) Prior Publication Data

US 2018/0129908 A1     May 10, 2018

Related U.S. Application Data

(63) Continuation of application No. 14/264,183, filed on Apr. 29, 2014, now Pat. No. 9,898,685.

(51) Int. Cl.
*G06K 9/00*       (2006.01)
*G06K 9/62*       (2006.01)
(Continued)

(52) U.S. Cl.
CPC ..... *G06K 9/6215* (2013.01); *G06F 17/30047* (2013.01); *G06F 17/30247* (2013.01);
(Continued)

(58) Field of Classification Search
CPC .............. G06K 9/627; G06K 9/00221; G06K 9/00624; G06K 9/00744; G06K 9/6215;
G06F 17/30047; G06F 17/30247; G06F 17/30784; G06F 17/30825; G06F 17/30256; G06F 17/30867; H04N 21/251
See application file for complete search history.

(56) References Cited

U.S. PATENT DOCUMENTS 3,700,866 A    10/1972   Taylor
5,893,095 A    4/1999   Jain et al.
(Continued)

FOREIGN PATENT DOCUMENTS

JP     2013074488 A     4/2013
WO    2011/009101       1/2011

OTHER PUBLICATIONS

"International Preliminary Report on Patentability", PCT/US15/26991, dated Nov. 1, 2016.
(Continued)

*Primary Examiner* — Amara Abdi
(74) *Attorney, Agent, or Firm* — Guntin & Gust, PLC; Jay H. Anderson

(57) ABSTRACT

Aspects of the subject disclosure may include, for example, a method for determining a first set of features in first images of first media content, generating a similarity score by processing the first set of features with a favorability model derived by identifying generative features and discriminative features of second media content that is favored by a viewer, and providing the similarity score to a network for predicting a response by the viewer to the first media content. Other embodiments are disclosed.

20 Claims, 7 Drawing Sheets

(51) Int. Cl.
  *H04N 21/25* (2011.01)
  *G06F 17/30* (2006.01)
(52) U.S. Cl.
  CPC .. *G06F 17/30784* (2013.01); *G06F 17/30825* (2013.01); *G06K 9/00221* (2013.01); *G06K 9/00624* (2013.01); *G06K 9/00744* (2013.01); *G06K 9/627* (2013.01); *H04N 21/251* (2013.01)

(56) References Cited

U.S. PATENT DOCUMENTS

| | | | |
|---|---|---|---|
| 6,005,597 | A | 12/1999 | Barrett et al. |
| 6,020,883 | A | 2/2000 | Herz et al. |
| 6,418,424 | B1 | 7/2002 | Hoffberg et al. |
| 6,563,959 | B1 | 5/2003 | Troyanker |
| 6,606,623 | B1 | 8/2003 | Hsieh et al. |
| 6,744,935 | B2 | 6/2004 | Choi et al. |
| 6,826,316 | B2 | 11/2004 | Luo et al. |
| 6,847,733 | B2 | 1/2005 | Savakis et al. |
| 7,194,752 | B1 | 3/2007 | Kenyon et al. |
| 7,263,205 | B2 | 8/2007 | Lev |
| 7,665,035 | B2 | 2/2010 | Burnett |
| 8,213,725 | B2 | 7/2012 | Loui et al. |
| 8,358,856 | B2 | 1/2013 | Loui et al. |
| 8,433,140 | B2 | 4/2013 | Ke et al. |
| 8,498,473 | B2 | 7/2013 | Chong et al. |
| 8,532,377 | B2 | 9/2013 | Skaff et al. |
| 2006/0031217 | A1 | 2/2006 | Smith et al. |
| 2009/0006368 | A1 | 1/2009 | Mei et al. |
| 2009/0210395 | A1 | 8/2009 | Sedam |
| 2010/0191689 | A1* | 7/2010 | Cortes ............... G06F 17/30784 706/46 |
| 2010/0199295 | A1 | 8/2010 | Katpelly et al. |
| 2011/0041080 | A1 | 2/2011 | Fleischman et al. |
| 2011/0093337 | A1* | 4/2011 | Granit ................ G06Q 30/0251 705/14.53 |
| 2011/0320380 | A1 | 12/2011 | Zahn et al. |
| 2012/0096011 | A1 | 4/2012 | Kay et al. |
| 2012/0236201 | A1* | 9/2012 | Larsen .................. G06Q 10/10 348/468 |
| 2013/0007618 | A1* | 1/2013 | Dodson .............. H04N 21/4828 715/716 |
| 2013/0343598 | A1 | 12/2013 | Kocks et al. |
| 2014/0003648 | A1 | 1/2014 | Fedorovskaya et al. |
| 2014/0003716 | A1 | 1/2014 | Fedorovskaya et al. |
| 2015/0020121 | A1 | 1/2015 | Paugh et al. |

OTHER PUBLICATIONS

Baluja, Shumeet et al., "Video Suggestion and Discovery for YouTube: Taking Random Walks Through the View Graph", WWW, Beijing China, ACM 978-1-60558-085-2/08/04., 2008, 10 pages.

Dimitrova, Nevenka, "Applications of Video-Content Analysis and Retrieval", IEEE, 2002, 14 pages.

Ferman, A. M., "Two-Stage Hierarchical Video Summary Extraction to Match Low-Level User Browsing Preferences", IEEE Transactions on Multimedia, vol. 5, No. 2, Jun. 2003, 244-256.

Hua, X-S et al., "Optimization-Based Automated Home Video Editing System", IEEE Transactions on Circuits and Systems for Video Technology, IEEE Service Center, vol. 14, No. 5, May 1, 2004, 572-583.

Yang, Bo et al., "Online Video Recommendation Based on Multimodal Fusion and Relevance Feedback", CIVR '07 Proceedings of the 6th ACM International Conference on Image and Video Retrieval, Jul. 11, 2007, 73-80.

Yang, Bo, "Online Video Recommendation Based on Multimodal Fusion and Relevance Feedback", 2007, pp. 73-80.

* cited by examiner

100

200

METHOD AND APPARATUS FOR ANALYZING MEDIA CONTENT

CROSS-REFERENCE TO RELATED APPLICATIONS

This application is a continuation of U.S. application Ser. No. 14/264,183, filed Apr. 29, 2014, which is incorporated by reference herein in its entirety.

FIELD OF THE DISCLOSURE

The subject disclosure relates to a method and apparatus for analyzing media content, and, more particularly, for generating recommendations for media content.

BACKGROUND

Media content is typically experienced by consumers via devices such as computers, televisions, radios, and mobile electronics. Media content can be created by many kinds of entities including traditional producers of content, such as artists, studios, and broadcasters. Today, the proliferation of video cameras, especially as integrated into mobile communication devices, has resulted in a large amount content generated by consumers of content. Modern communications networks provide interconnectivity between consumers and various communication and storage devices. As network capabilities expand, these interconnections provide new opportunities to enhance the ability for consumers to enjoy media content by experiencing a variety of content over multiple devices.

BRIEF DESCRIPTION OF THE DRAWINGS

Reference will now be made to the accompanying drawings, which are not necessarily drawn to scale, and wherein.

DETAILED DESCRIPTION

Figure 1:
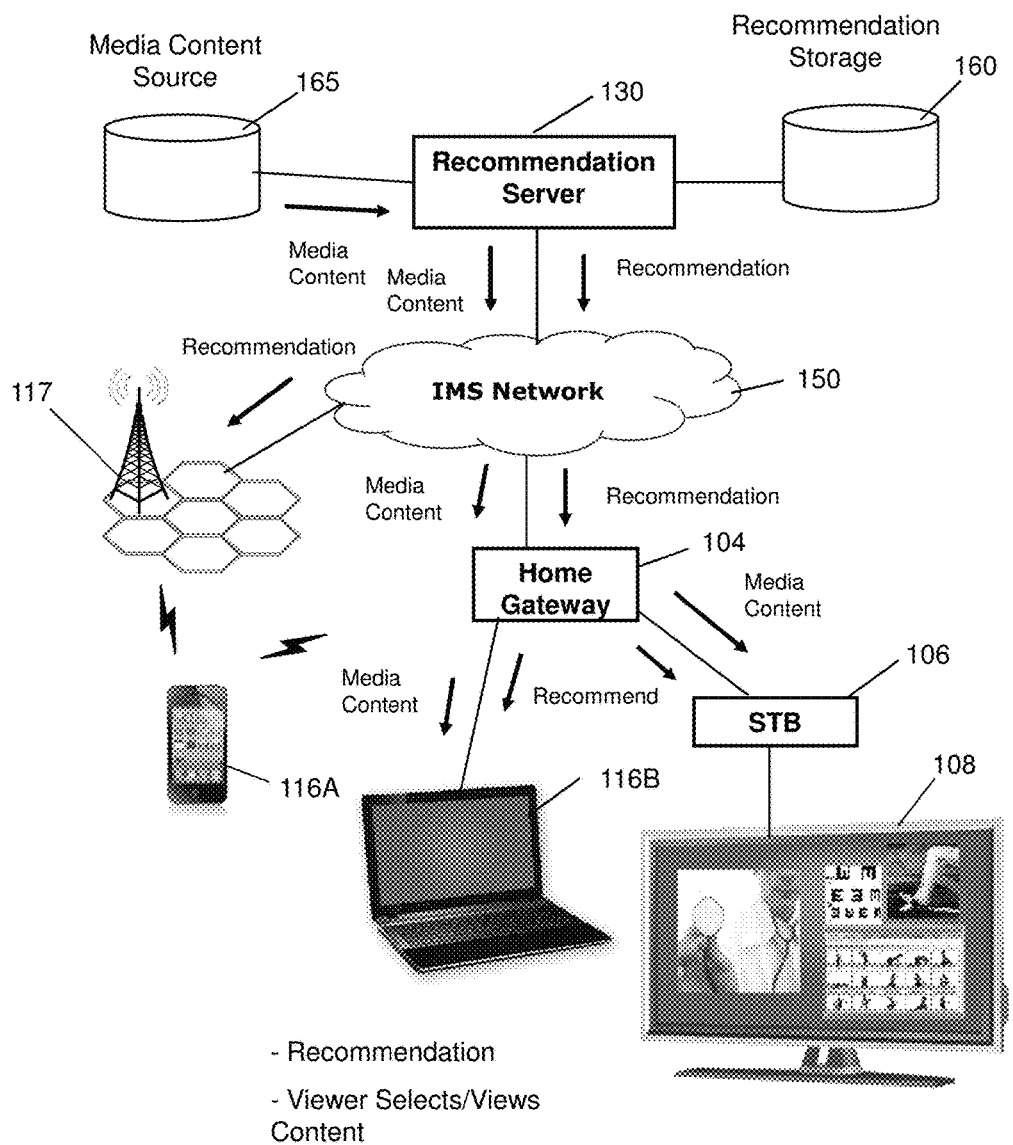
FIG. 1 depicts illustrative embodiments of a system that can be utilized for generating recommendations for media content.

The subject disclosure describes, among other things, illustrative embodiments for generating recommendations for media content. Newly-available media content can be compared to previously-viewed media content to generate a recommendation. Images of the newly-available media content can be analyzed to identify features and objects. These identified features and objects can be compared to features and objects present in the previously-viewed media content to determine the similarity between the newly-available and the previously-viewed media content. A recommendation can be generated for the newly-available media content according to the degree of similarity or dissimilarity that has been determined. Other embodiments are included in the subject disclosure.

One embodiment of the subject disclosure includes a device comprising a processor and a memory that stores executable instructions that, when executed by the processor, facilitate performance of operations, including scanning a first plurality of images of first media content to detect a first plurality of visual features present within the plurality of images. The processor can perform operations including comparing the first plurality of features to a second plurality of features in a second plurality of images of second media content to identify generative features and discriminative features with respect to the first media content and the second media content. The second media content can have been previously experienced by a viewer. The processor can further perform operations including determining a set of similarity matrices according to the generative features and the discriminative features. The processor can perform operations including processing the similarity matrices to generate a similarity score according to correlated image features of a set of previously-experienced media content. The processor can perform operations including generating a recommendation for the first media content according to the similarity score.

One embodiment of the subject disclosure includes a machine-readable storage medium, comprising executable instructions. The executable instructions can cause a processor to perform operations including comparing first features of first images of first media content to second features of second images of a plurality of media content items to identify common features and unique features with respect to the first media content and the plurality of media content items. The plurality of media content items can have been experienced by a viewer. The executable instructions can also cause the processor to perform operations including generating a similarity score according to the common features and the unique features. The executable instructions can further cause the processor to perform operations including transmitting the first media content to a device if the similarity score exceeds a threshold.

One embodiment of the subject disclosure includes a method including determining, by a system comprising a processor, a first set of features in first images of first media content. The method can further include generating, by the system, a similarity score by processing the first set of features with a favorability model derived by identifying generative features and discriminative features of second media content. The second media content can be favored by a viewer. The method can also include providing, by the system, the similarity score to a network for predicting a response by the viewer to the first media content.

Figure 2:
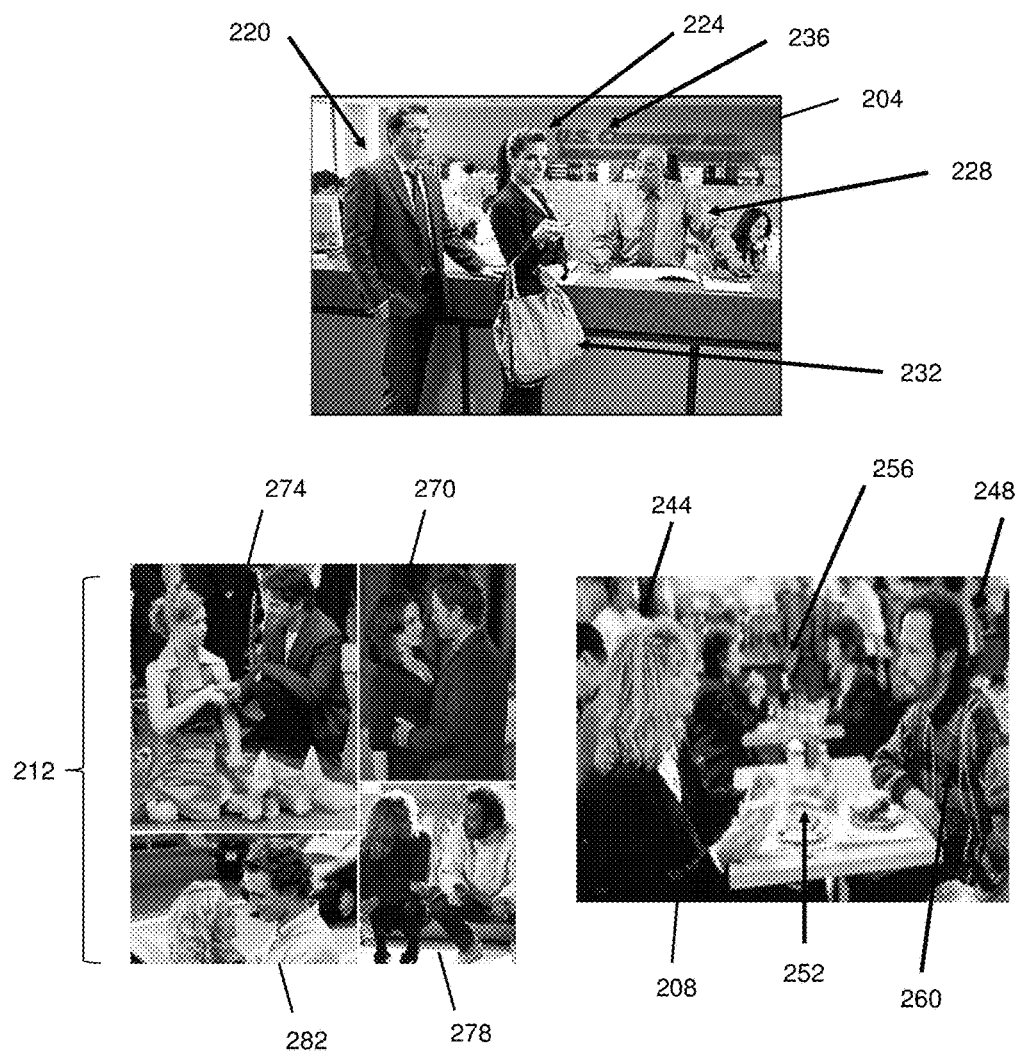
FIG. 2 depicts exemplary images illustrating, in part, media content analyzed according to the system of FIGS. 1, 5, and 6, and the method of FIG. 3.

FIG. 1 depicts an illustrative embodiment of a system 100 that can be utilized for automatically generating recommendations for media content. FIG. 2 depicts exemplary images illustrating, in part, automatically generating recommendations for media content according to the system of FIG. 1.

In one or more embodiments, the system 100 can include a communication network 150. The system 100 can include a subscription telecommunication service, such as an Internet Protocol Multimedia Subsystem (IMS) network 150 for providing cellular/mobile communications, Internet access, and content to mobile communication devices 116A via a mobility network of mobile base stations 117. The system can include a subscription content service, such as an Internet Protocol Television (IPTV) network for providing media content to subscribers. The IPTV network can be part of a cable, satellite, or DSL-based media content delivery system. The media content can be any type of viewable content, such as broadcast television, cable or premium television, video on demand, or pay-per-view television. The IPTV network can deliver media content to media processing devices 106 and media display devices 108 at subscriber locations via gateway devices 104. In one or more embodiments, the system 100 can include wireless computer devices 116B that are connected to the communication network 150. For example, a wireless computer device 116B can be coupled to the communication network 150 via a gateway device 104

In one or more embodiments, the system 100 can include one or more recommendation servers 130 that are associated with the IMS network 150. In one embodiment, a recommendation server 130 can communicate with media content sources 165 over the IMS network 150. The recommendation server 130 can communicate with a recommendation storage device 160. For example, the recommendation storage device 160 can be cloud-based storage, dedicated server storage, or networked storage devices, even local storage devices that are linked to the network 150 via software. The recommendation server 130 can further communicate with media processor devices 106 and media display devices 108 over the IMS network 150. Mobile communication devices 116A-B can communicate with the IMS network 150 using one or more components of a mobility network 117, such as cellular base stations for receiving and transmitting wireless communication signals and/or wireless connections.

In one or more embodiments, a media processor device 106 can communicate with a recommendation server 130 via the IMS Network 150 by way of a gateway device 104. The media processor device 106 can receive user inputs from a remote control device for performing functions, such as powering ON/OFF, selecting channels for viewing media programs, adjusting volume, and/or programming a digital video recorder. The media processor device 106 can receive a user input for selecting a media program and/or a channel for receiving a media program. In one example, the media processor device 106 can present an electronic programming guide at a media device 108 for assisting in the selection of media programming. In one or more embodiments, the media processor device 106 can receive cluster group images from the recommendation server 130 so that a viewer of the media device 108 can easily review recommendations for media content and select and view media content.

In one or more embodiments, the recommendation server 130 can receive media content items from one or more media content sources. For example, media content can be uploaded from end-user sources 116A, and 116B. Uploading events can be locally directed at end-user sources 116A, and 116B, or can be directed by the recommendation server 130 or by another network device. In another example, media content items can be received from one or more media sources 165, such as sources of broadcast programming or video-on-demand (VOD) programming. For example, a copy of all or part of a broadcast or VOD program can be received at the recommendation server 130. In another embodiment, media content, such as video, audio, and/or still images can be received from a social networking system or site. In one embodiment, media content items and corresponding narrative description data can be stored at a recommendation storage device 160. The recommendation storage device 160 can store the media content items, image/video feature data, similarity data, and/or recommendation data as cloud-accessible content and information. The image/video feature data, similarity data, and/or recommendation data can be generated by the recommendation server 130 or can be received along with media content from a media content source 165.

In one or more embodiments, the recommendation server 130 can track media content that has been viewed by a user of the system 100. For example, a user can subscribe to a service for accessing media content. The recommendation service 130 access of all media content that the subscribing user has previously-viewed. In one embodiment, the recommendation server 130 can update information tracking previously-viewed in recommendation storage 160 each time the subscriber views new content via the system 100. In another embodiment, the subscriber can provide information regarding media content consumption by opting into an option to share this information for any media consumed at devices 116A of the subscriber, regardless of the source or system used in accessing this content. For example, the subscriber can view content from a DVD loaded at a device 116B or can view content downloaded from a different system. The device 116B can share information tracking these content viewings with the recommendation server 130 so that the recommendation server 130 can maintain a comprehensive tracking database for subscriber. In another embodiment, the recommendation server 130 can obtain the viewing information for the subscriber from another recommendation or media content service at a different system.

In one or more embodiments, the recommendation server 130 can receive a notice of an availability of new media content. In one embodiment, notice can be transmitted to the recommendation server 130 whenever media content is released for distribution over the system 100. For example, after theatrical release of motion pictures, it is common practice to release this content for video-on-demand distribution via the Internet. Similarly, after a season of a television series, or, in some cases, a few days or weeks after a show is broadcast, content can be released for distribution via Internet-based viewing services. In another example, a library of motion pictures and/or television series may become available for distribution by the system 100 due to a licensing agreement. In one embodiment, the recommendation server 130 can respond to a notice of new content availability by determining if a subscriber has previously-viewed the content. The recommendation serve 130 can compare the newly-available content items against a listing of previously-viewed content items for the subscriber from the recommendation storage 160 or another storage mechanism. In one embodiment, if the recommendation server 130 determines that the subscriber has not viewed the newly-available content, then the recommendation server 130 can analyze the content to determine its similarity to previously-viewed content and to make a viewing recommendation accordingly.

In one or more embodiments, the recommendation server 130 can analyze media content to generate recommendations for content. In one embodiment, the content can be broken down into a set of captured still images, or screen captures. For example, the media content can divided into a series of images 204, as shown in FIG. 2. In one or more embodiments, the recommendation server 130 can analyze images from the media content to detect images features. In one embodiment, images 204 scanned from the media content can be stored separately from the media content for further analysis and/or display. For example, the media content and/or a series of images 204, and/or similarity scores and/or recommendations can be stored at the recommendation storage 160, which can be a cloud-based resource. In one embodiment, the recommendation server 130 can divide the media content into images 204. In another embodiment, image division can be performed at a different device, such as at a user device 116B or a network device or by a service provider resource, such as the media content source 165.

In one or more embodiments, the recommendation server 130 can analyze images 204 from media content to determine a set of image features of the content. The recommendation server 130 can perform image analysis via digital imaging techniques. The image analysis can include analyzing the images for the presence of edges, or boundaries of features. In one embodiment, edge detection, filtering, texture synthesis, and smoothing can be performed to thereby detect and define feature boundaries in the visual images. Once feature boundaries are detected in images, then the recommendation server 130 can attempt to match these two-dimensional features to known three-dimensional objects via shape analysis. For example, the various known three-dimensional objects can be described according to three-dimensional models and/or solid geometry, which can be translated in three-dimensions and projected onto two-dimension space. The two-dimensional features that are detected in the images can be matched against a database of projected two-dimensional representations of known three-dimensional objects. In this way, the recommendation server 130 can detect the presence and orientation of known objects in the images. For example, a handbag 232, a sign 236, and/or human beings 220, 224, and 118 can be detected in the images 204.

In one or more embodiments, the object recognition can be used to detect, catalog, and synthesize complex objects and scene within an image. For example, the recommendation server 130 can determine that an image includes a series of rectangular objects and that these objects are consistent with known three-dimensional models of a service counter. Further, the recommendation server 130 can determine that other objects in the image are consistent with three-dimensional models of human beings. The presence of these detected objects can be recognized as consistent with a two-dimensional representation of a scene a governmental service center as depicted in an image 204. Thus, the recommendation server 130 can catalog the images of three people 220, 224, and 228, and a government service center as a matter of the digital image analysis.

In one or more embodiments, the recommendation server 130 can further process the detected objects against additional recognition algorithms. For example, a facial recognition algorithm can be used to detect the presence of human faces within the images and to compare these human faces to databases of known faces. The database of known faces can include the faces of famous persons, such as celebrities, actors, and/or other "known" people. The database can further include the faces of people that are known to a user of the system 100, such as family or friends from a social network or a digital photo book. The recommendation server 130 can use such a database of known faces to determine if any of the detected faces in images match faces to which known identities are attached. In one embodiment, where the media content that is being analyzed is known to be a commercially produced movie or television show, then this media content item can further be associated with descriptive data, such as metadata or data from an online database. This additional descriptive data can include, for example, a roster of actors, who participated in the media content. The recommendation server 130 can utilize this information to assign and coordinate detected instances of faces of known actors with the characters that they are portraying in the media content piece. So, for example, the people present in the office scene at an image 204 can be determined to be Actors A, B, and C, who further correspond to Characters X, Y, and Z from the content. The recommendation server 130 can use this information to further catalog features in the scene. In one embodiment, the recommendation server 130 can include the actors' real names as well, in a catalog of features detected in the image 204.

In one or more embodiments, the recommendation server 130 can further analyze the detected features and objects in the images to identify additional objects and/or to determine various additional information, such as the presence of animate and inanimate object, distances and orientations between detected objects, identifiable locations of scenes, multiple occurrences of objects, time of appearance and/or disappearance of objects, colors, contrast, indoor vs. outdoor locations, orientation of objects, or condition of objects.

In one embodiment, two-dimensional features can be detected and identified. The images 204 can be further analyzed to determine the extent to which specific two-dimensional features are visible over time in multiple images. A third dimension (time) can thereby be added as a spatio-temporal characteristic of these identified two-dimensional features to define a "three-dimensional" feature.

In one or more embodiments, the recommendation server 130 can filter the raw catalog of features detected in the media content to select the most relevant features. For example, the recommendation server 130 can filter based on the number of occurrences of features such that, in one case, features that occur in less than 10% of the content are excluded from further analysis. In another case, features that occur for less than five seconds of running time can be excluded. In another case, human beings that are detected in the images but not identified to known actors or characters can be excluded. The filtering algorithm can be configured to limit the number of features for the sake of ease of processing and analysis. In one embodiment, the filtering can be configured specifically for the subscriber. For example, a subscriber's user profile can specify a particular content feature, such as automobile chases or dancing, in which the subscriber is particularly interested. The recommendation server 130 can filter the media content specifically for these features and insure that any instances of these features are included in the set of relevant features. In one or more embodiments, the recommendation server 130 can convert the set of relevant features detected in the content into matrices of features for ease of manipulation in the process of comparing these features to features detected in other media content.

In one or more embodiments, the recommendation server 130 can similarly analyze second media content for purposes of comparing the second media content to the new or unviewed media content. In one embodiment, the second media content has been viewed by the subscriber. The recommendation server 130 can select the second media content based on the subscriber's media content viewing information accessed, for example, from the recommendation storage 160. In one embodiment, the second media content can be selected from previously-viewed content based on being the last content viewed or based on being of the same genre as the new, unviewed content or based on being content that is known to be favorably viewed by the subscriber. In one embodiment, the recommendation server 130 can scan images from the second media content, detect objects and features, perform object recognition, filter the objects, and generate a set of features for the second media content. In another embodiment, the recommendation server 130 can receive the set of features, as previously scanned and cataloged, for the second media content from the recommendation storage device 160 or another storage location. A second set of features for the second media content can include features 244-252 that have been scanned from images 208 of the second media content item.

In one or more embodiments, the recommendation server 130 can compare the first set of features from the unviewed media content to the second set of features from the previously-viewed media content. In one embodiment, the comparison of the first and second sets of features can be compared using matrices of features. In one embodiment, the comparing of the first and second sets of features can result in classifying features as generative or discriminative. A generative feature can be defined as a feature that is common or similar to both of the sets of features and, therefore, indicates similarity between the first and second media content. A discriminative feature can be defined as a feature that exists only in the first set or the second set of features and, therefore, indicates dissimilarity or variability between the first and second media content.

In one or more embodiments, the recommendation server 130 can further process the analysis of similarity (and dissimilarity) into a similarity score. The similarity score can correlate to the degree to which the first and second sets of features are similar. In one embodiment, the recommendation server 130 can process the first and second feature set data, such as through a matrix comparison, into a raw results matrix of similarity. The recommendation server 130 can further process the raw results matrix according to a similarity model that has been trained for the subscriber. In one embodiment, the similarity model can be trained using a training set of media content that has been previously viewed by the subscriber. For example, the recommendation server 130 can access a list of previously viewed content that has been tracked for a subscriber (or otherwise provided by the subscriber or other services). The recommendation server 130 can access all of the media content from the list or can access a subset of this content. For example, the recommendation server can selectively access only those items for which the subscriber has indicated a favorable viewing. In another example, the recommendation server 130 can access only items for a single genre of content or for a particular time period of content creation or particular time period of viewing (last twenty items viewed).

In one or more embodiments, the recommendation server 130 can scan images from the second media content, detect objects and features, perform object recognition, filter the objects, and generate a set of features for each item of media content in the training set of media content. In one embodiment, the recommendation server 130 can receive one or more of the sets of features, as previously scanned and cataloged, for the training media content from the recommendation storage device 160 or from another storage location. The training sets of features for the second media content can include features that have been scanned from images 270-282 of the training set of media content items 212. For example, a subscriber may have indicated a keen interest in romantic comedies.

The recommendation server 130 can provide recommendations for romantic comedies taking into account the romantic comedies, which have been previously-viewed by the subscriber. In this case, the recommendation server 130 can train a similarity model based only on romantic comedies that have been viewed by the subscriber. In one embodiment, all romantic comedies are included in the analysis. If the database of previously-viewed content does not include an indication as to whether the subscriber like the content, then the assumption in the model is that the subscriber liked whatever he/she has viewed. In another embodiment, if the database includes information on the subscriber's reaction to the content, then the model can be trained using only examples of content that the viewer indicated as liking. In another embodiment, the model can be trained using a deep hierarchy of features from content that the subscriber like or did not like but the model can incorporate this additional information using a weighting function.

In one embodiment, the recommendation server 130 can selectively compare the unviewed media content 204 to a single previously-viewed media content item 208 or to all or part of the set of previously-viewed media content items 212 or to the training set of media content or to a combination of all of these. For example, the unviewed media content item 204 can be compared to the subscriber's favorite movie or all time or favorite movie in the genre or the last movie that the subscriber watched. In this way, the recommendation server can generate a similarity score via the model that is specific to content that the subscriber is very familiar. In another example, the unviewed media content item 204 can be compared to a large number of previously-viewed content items 212. In this way, the recommendation server 130 can leverage a large set of observations to reduce the chances of misclassifying the unviewed based on a comparison to a relatively small set of features from a single item of previously-viewed content.

In one or more embodiments, the recommendation server 130 can further convert the similarity score into a recommendation for the unviewed content. In one embodiment, the recommendation server 130 can simply apply a threshold test to determine if the similarity score is sufficiently high to trigger a recommendation. The threshold level can be configured by the recommendation server 130. For example, a recommendation can be triggered liberally, even for cases of loose correlation, on the assumption that the subscriber does not want to miss anything that could be of interest. On the other extreme, the recommendation could be triggered conservatively, only for cases of close correlations, on the assumption that the subscriber does not want to waste any time watching items that have a low probability of interest. In one embodiment, the recommendation threshold can be configured according to a profile of the subscriber.

In one or more embodiments, the recommendation server 130 can provide the recommendation to devices 116A, 116B, 106 of the subscriber. For example, the recommendation server can transmit a notification via email, text, and/or other direct contact. In another example, the recommendation server 130 can provide the notice indirectly using, for example, a recommendation channel on a television service or a recommendation section of a portal. In one embodiment, the recommendation server 130 can provide a recommendation by way of offering an immediate opportunity to view the content to the subscriber. For example, the recommendation server 130 embed link to access the content in a graphical element of a graphical user interface of a portal. In another example, the recommendation server can cause the unviewed content to be accessible at a recommendation channel of a television system.

Figure 3:
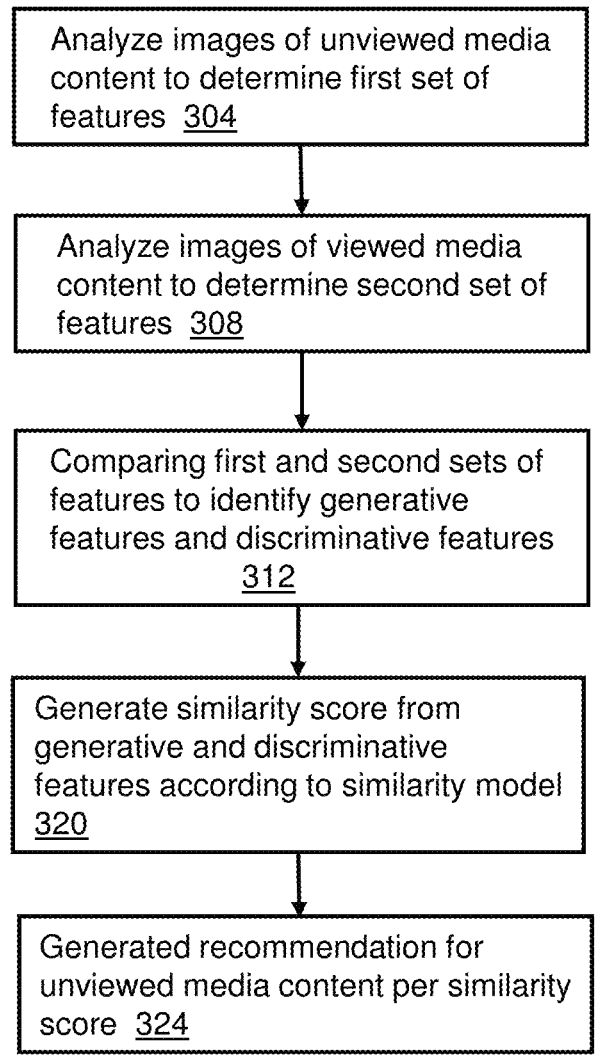
FIG. 3 depicts an illustrative embodiment of a method operating in portions of the system described in FIGS. 1, 5, and 6.
Figure 4:
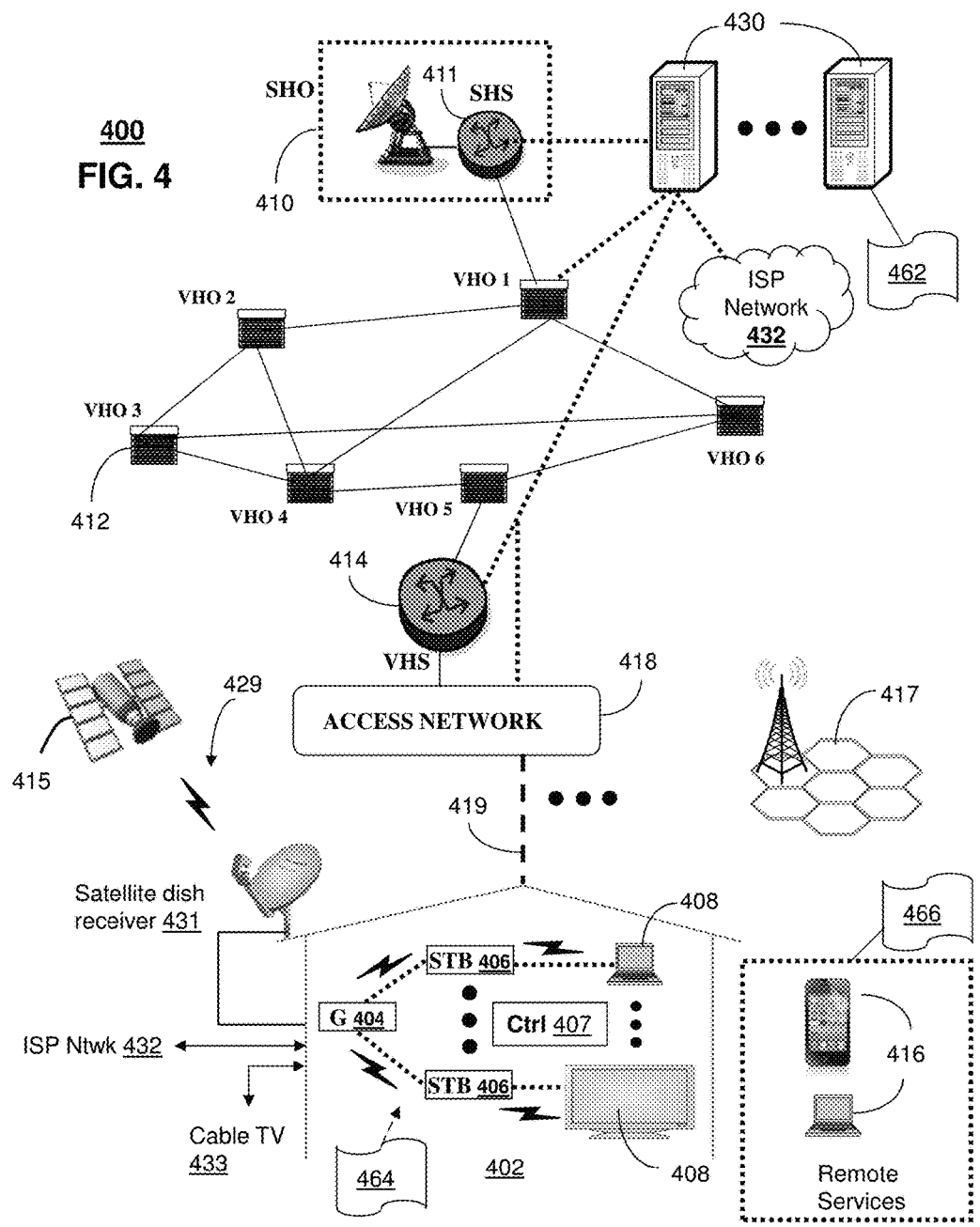
FIGS. 4 and 5 depict illustrative embodiments of communication systems for generating recommendations for media content according to embodiments illustrated in FIGS. 1, 4, and 5.
Figure 5:
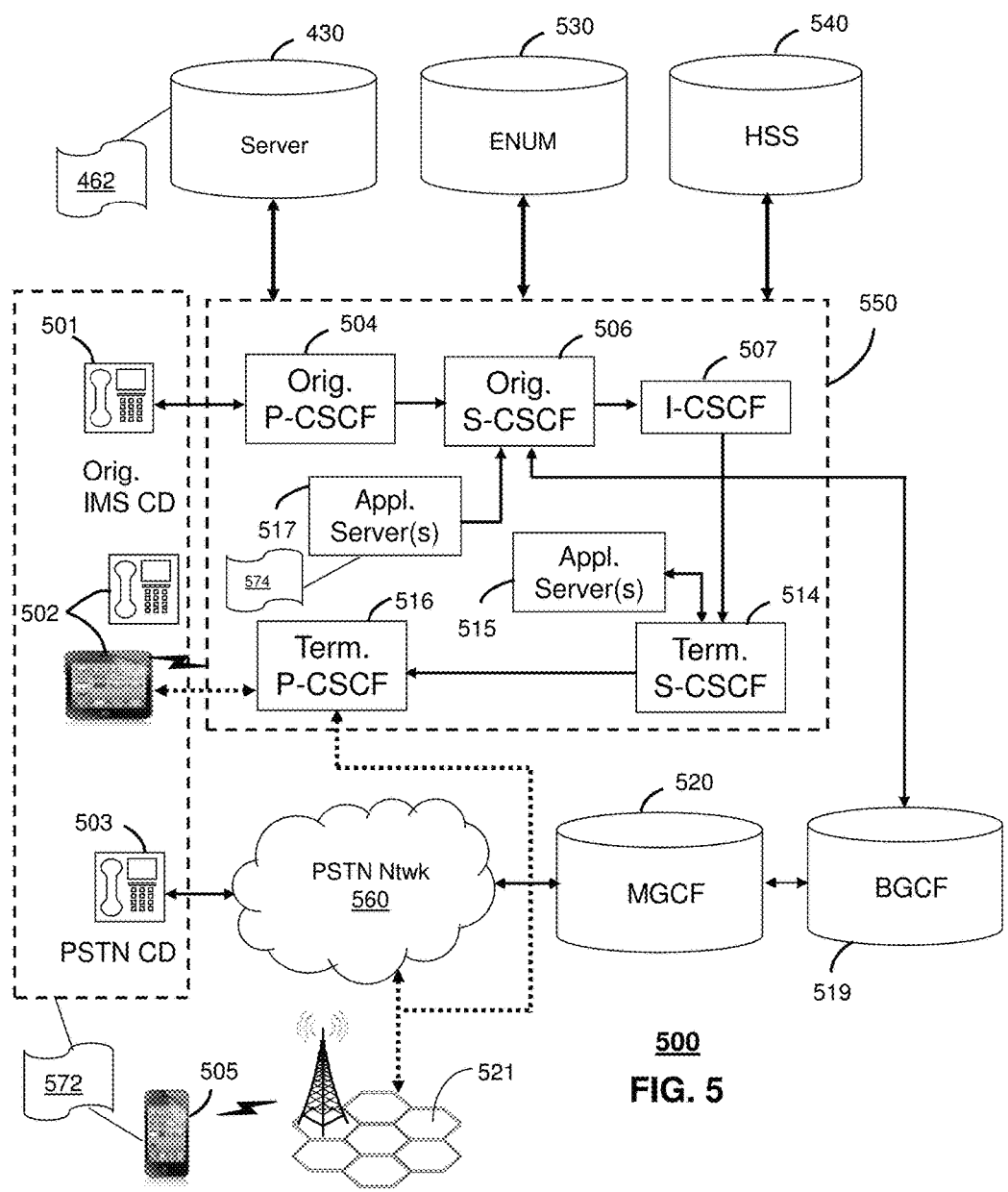

FIG. 3 depicts an illustrative embodiment of a method operating in or using portions of the system described in FIGS. 1, 4, and 5. Method 300 can begin with step 304, in which images of unviewed media content can be analyzed to determine a first set of features. The recommendation server 130 can perform image analysis via digital imaging techniques to detect rudimentary features, such as the presence of edges, textures, or boundaries of features. The recommendation server 130 can attempt to match these two-dimensional features to known three-dimensional objects via shape analysis and can, further, perform object recognition to detect, catalog, and synthesize complex objects and scenes within an image. The recommendation server 130 can filter the raw catalog of features detected in the media content to select the most relevant features. The recommendation server 130 can convert the set of relevant features detected in the content into matrices of features for ease of manipulation in the process of comparing these features to features detected in other media content.

At step 308, images of viewed media content can be analyzed to determine a second set of features. The recommendation server 130 can analyze second media content for purposes of comparing the second media content to the new or unviewed media content. The recommendation server 130 can select the second media content based on the subscriber's media content viewing information accessed, for example, from the recommendation storage 160. The recommendation server 130 can scan images from the second media content, detect objects and features, perform object recognition, filter the objects, and generate a set of features for the second media content. The recommendation server 130 can receive the set of features, as previously scanned and cataloged, for the second media content from the recommendation storage device 160 or another storage location.

At step 312, the first and second sets of features can be compared to identify generative features and discriminative features. The recommendation server 130 can compare the first set of features from the unviewed media content to the second set of features from the previously-viewed media content. The comparison of the first and second sets of features can be compared using matrices of features and can result in classifying features as generative or discriminative.

At step 320, the generative and discriminative features can be used to generate a similarity score according to a similarity model. This model can take into account the non-linear characteristics of these features, which can either be modeled using analytical manifolds, or be learnt using deep feature hierarchies derived from the data. The similarity score can correlate to the degree to which the first and second sets of features are similar, by respecting the underlying non-Euclidean space corresponding to the metrics from which the similarity is computed. The similarity score can correlate to the degree to which the first and second sets of features are similar. The recommendation server 130 can process the first and second feature set data, such as through a matrix comparison, into a raw results matrix of similarity. The recommendation server 130 can process the raw results matrix according to a similarity model that has been trained for the subscriber.

At step 324, the similarity score can be used to generate a recommendation for the unviewed content. The recommendation server 130 can apply a threshold test to determine if the similarity score is sufficiently high to trigger a recommendation. The recommendation threshold can be configured according to a profile of the subscriber. The recommendation server 130 can provide the recommendation to devices 116A, 116B, 106 of the subscriber. The recommendation server can transmit a notification via email, text, and/or other direct contact. The recommendation server 130 embed link to access the content in a graphical element of a graphical user interface of a portal.

FIG. 4 depicts an illustrative embodiment of a first communication system 400 for delivering media content. The communication system 400 can represent an Internet Protocol Television (IPTV) media system. Communication system 400 can be overlaid or operably coupled with the system of FIG. 1 as another representative embodiment of communication system 400. Recommendation server 130 can be utilized for automatically generating recommendations for media content. Visual features and objects detected in images of unviewed media content can be compared to visual features and objects in images of viewed media content to determine a degree of similarity between the viewed and unviewed media content. This degree of similarity can be used to generate a recommendation for the unviewed media content.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a recommendation server 430. The recommendation server 430 can use computing and communication technology to perform function 462, which can include, among other things, automatically generating recommendations for media content from any of several sources, including broadcast sources 410 and end-user devices 416. The media processors 406 and wireless communication devices 416 can be provisioned with software functions 464 and 466, respectively, to utilize the services of recommendation server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 5 depicts an illustrative embodiment of a communication system 500 employing an IP Multimedia Subsystem (IMS) network architecture to facilitate the combined services of circuit-switched systems and packet-switched systems. Communication system 500 can be overlaid or operably coupled with system 100 of FIG. 1 and communication system 400 as another representative embodiment of communication system 400. The system 500 can include a recommendation server 430 for generating recommendations for media content. The media content can be supplied from network sources, including broadcast media sources and user devices 502. The recommendation server 430 can generate and provide recommendations for media content to user devices 505 in the system via communications in the IMS network 550. Visual features and objects detected in images of unviewed media content can be compared to visual features and objects in images of viewed media content to determine a degree of similarity between the viewed and unviewed media content. This degree of similarity can be used to generate a recommendation for the unviewed media content.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The recommendation server 430 of FIG. 4 can be operably coupled to communication system 500 for purposes similar to those described above.

Recommendation server 430 can perform function 462 and thereby provide recommendation services to the CDs 501, 502, 503 and 505 of FIG. 5. CDs 501, 502, 503 and 505, which can be adapted with software to perform function 572 to utilize the services of the recommendation server 430. Recommendation server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
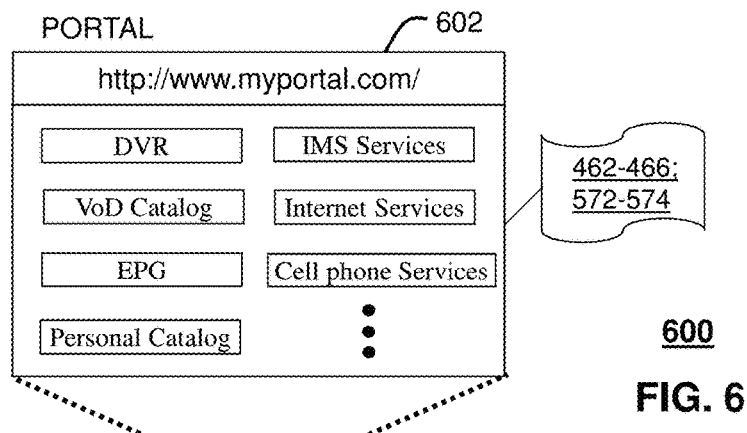
FIG. 6 depicts an illustrative embodiment of a web portal for configuring a server for generating recommendations for media content according to the communication systems of FIGS. 1, 5, and 6.
Figure 6:
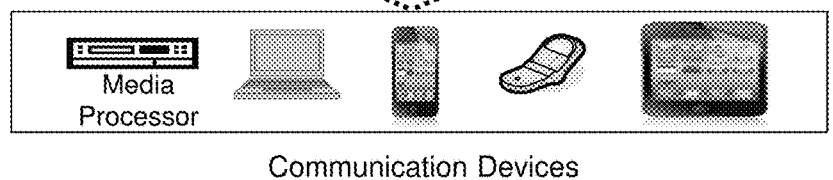

FIG. 6 depicts an illustrative embodiment of a web portal 602 which can be hosted by server applications operating from the computing devices 430 of the communication system 100 illustrated in FIG. 1. Communication system 600 can be communicatively coupled to system 100 of FIG. 1, communication 400, and/or communication system 500. The web portal 602 can be used for managing services of system 100 of FIG. 1 and communication systems 400-500. A web page of the web portal 602 can be accessed by a Uniform Resource Locator (URL) with an Internet browser using an Internet-capable communication device such as those described in FIGS. 1, and 4-5. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of system 100 of FIG. 1, and 400-500 of FIGS. 4-5.

Figure 7:
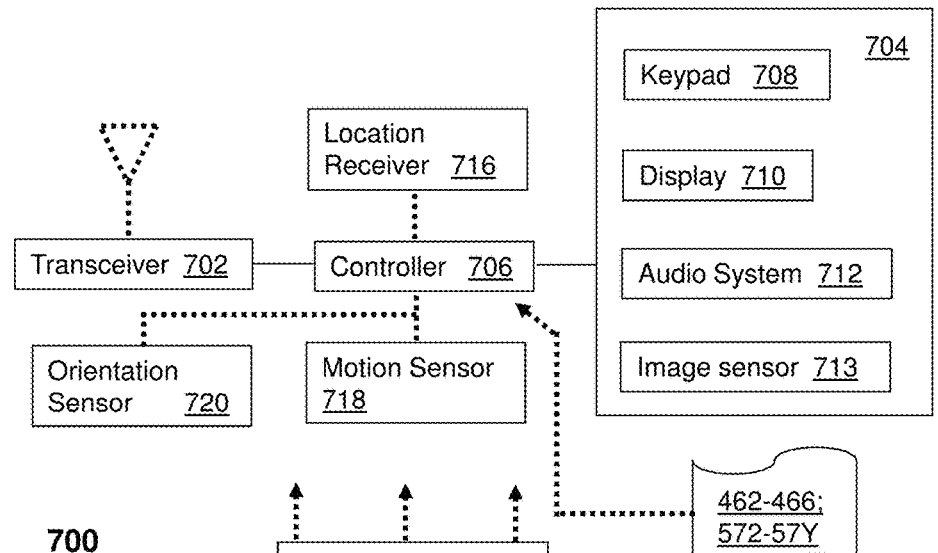
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIG. 1 and FIGS. 4-5. Communication device 700 in whole or in part can represent any of the communication devices described in FIGS. 1 and 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in the system of FIG. 1, and the communication systems 400-500 of FIGS. 4-5, such as a gaming console and a media player.

The communication device 700 shown in FIG. 7 or portions thereof can serve as a representation of one or more of the devices of system 100 of FIG. 1, communication system 400, and communication system 500. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, the recommendation server 130 can provide "anti-recommendation" information to the subscriber. The anti-recommendation information can describe media content that the recommendation server 130 has determined to not fit the interests of the subscriber. This information can be used by the subscribe to provide a reality check on the recommendations and/or to provide a list of media content that could be viewed to expand the subscriber's viewing tastes.

In one or more embodiments, the recommendation server 130 can provide not only the recommendation but also the similarity score. The subscriber can use the additional information to see how similar the new content is to the old content. In another embodiment, the recommendation server 130 can provide degrees of recommendations based on the similarity score. For example, a high similarity score could be used to generate a "strong" or "two thumbs up" recommendation. Alternatively, a similarity score that just barely clears the recommendation threshold can be used to generate a "weak" or "one thumbs up" recommendation.

In one or more embodiments, the recommendation server 130 can perform the analysis on a group of unviewed content. The recommendation can be put in the form of a ranked list showing strong to weak recommendations. In another recommendation, the recommendation server 130 can provide relative recommendations where, for example, the unviewed media content is placed into a list of all of the previously-viewed media content at a position relative to how much the subscriber is predicted to like the content. In another embodiment, the recommendation can be listed according to its relative score against all other content recommended over a time period, such as for the current year.

In one or more embodiments, the recommendation server 130 can perform the analysis for the unviewed media content based on a promotional trailer or a set of still images that have been provided for the content in pre-distribution phase. The recommendation can be labeled as "preliminary" or "trailer-based." In another embodiment, the recommendation server 130 can provide a recommendation that can save bandwidth needed for transmitting an entire video to a subscriber that, in reality, the subscriber will not have any interest in viewing. In another embodiment, the recommendation server 130 can provide a recommendation that can save the time of the subscriber by avoiding viewing content that will be of no interest. In another embodiment, the recommendation can be in the form of a priority list of content items.

In one or more embodiments, the recommendation server 130 can detect closed-captioning information and/or displayed text in the images. The recommendation server 130 can compare the text present in the unviewed and viewed content as part of the similarity analysis. In one or more embodiments, the unviewed content can be compared to more than one genre of previously-viewed content. Similarity scores and/or recommendations can be generated for the unviewed content with respect to each genre.

In one or more embodiments, the similarity score and/or recommendation can be provided to mobility devices and/or to websites, to provide information for streaming content and/or renting physical media (DVDs) and/or subscribing to services. In one or more embodiments, the subscriber can have a trained model that is based on his/her previously-viewed videos. The model can be used in any number of applications and can be transferable between applications and/or content service providers. In one or more embodiments, the notion of similarity can be used for recommending products and/or services based on media content associated with those products and services. For example, a new media content (an advertisement) describing a product or service can be analyzed with respect to prior content describing this product or service. The new media content can be directed to the subscriber based on knowledge of the similarity analysis.

In one or more embodiments, the similarity model can be trained by extracting, for example, 20 features from each content item in a training set of 10 content items and, then, determining which of these 200-features is common to two or more of the videos and which of are unique. Next, vectors can be used to compute distances between each of the videos using the vectors. In one or more embodiments, deep learning models can be used to automatically learn optimal features and compare the features to the model.

Figure 8:
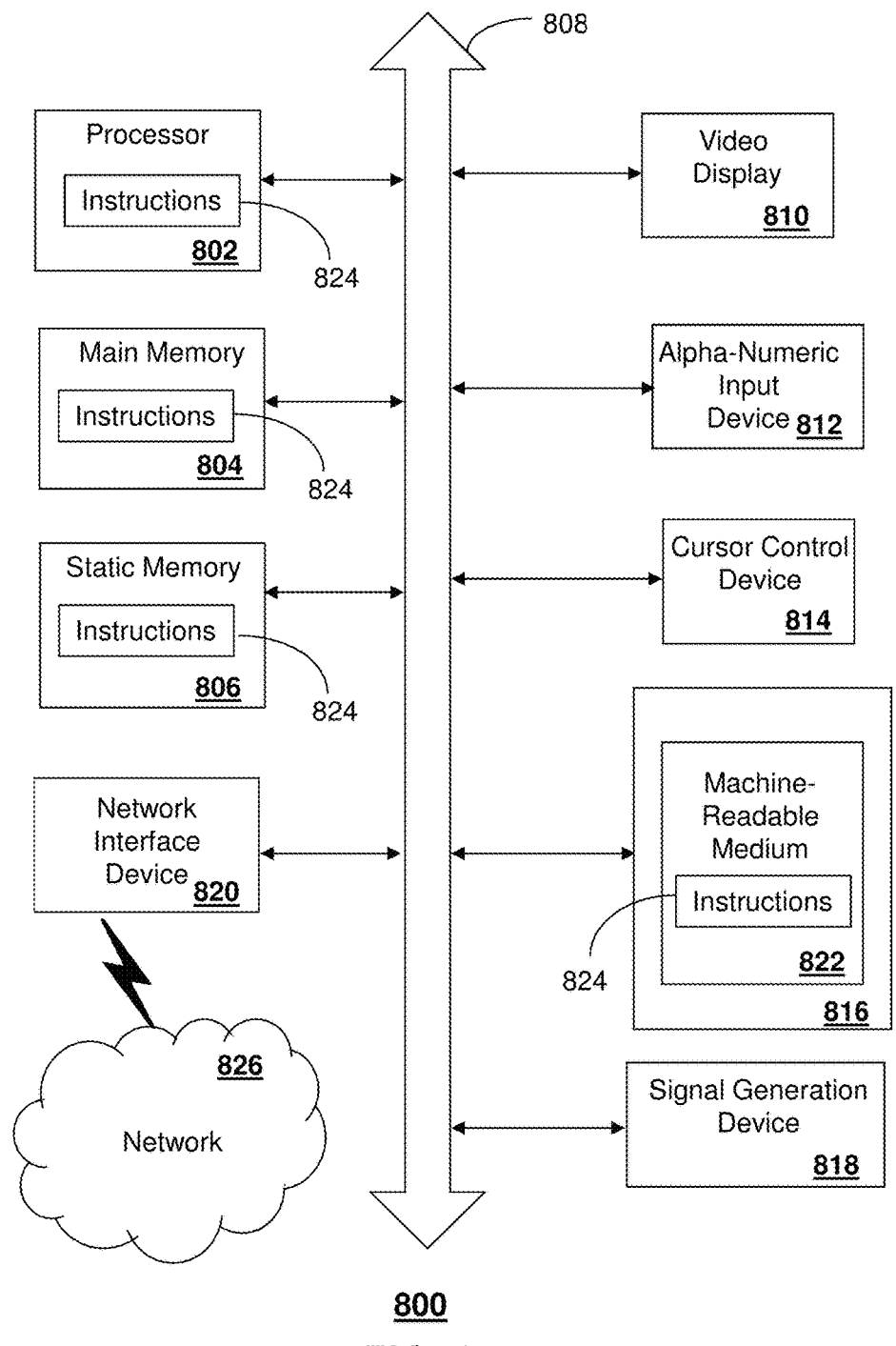
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the recommendation server 430, the media processor 406, the recommendation storage device 160, the mobile communication device 116A, and the computing device 116B of FIGS. 1-5. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, comprising:
   determining a first set of image objects in first images of first media content, wherein the first set of image objects are generated by filtering a first catalog of image objects scanned from the first media content using first criteria, wherein the first criteria comprise a number of occurrences of an image object, a running time of occurrence of the image object, or a combination thereof;
   generating a similarity score by processing the first set of image objects with a similarity model derived by identifying generative visual features and discriminative visual features scanned from second media content using second criteria, wherein the second media content is determined to be favored by a viewer, wherein the second media content is selected from a set of content being viewed by the viewer within a time period, and wherein one or both of the first criteria and the second criteria include information from a viewer profile; and
   providing the similarity score for predicting a response from equipment of the viewer regarding the first media content.

2. The device of claim 1, wherein the operations further comprise generating a recommendation for the first media content according to the similarity score.

3. The device of claim 2, wherein the operations further comprise receiving an indication of a viewing decision responsive to the recommendation.

4. The device of claim 2, wherein the recommendation is generated in accordance with the similarity score exceeding a threshold.

5. The device of claim 1, wherein the device communicates with equipment of the viewer over a network, and wherein the operations further comprise transmitting the first media content via the network in accordance with the similarity score exceeding a threshold.

6. The device of claim 1, wherein the operations further comprise training the similarity model using a hierarchy of features of the second audio visual content.

7. The device of claim 1, wherein the second media content comprises a predetermined number of previously viewed media content items.

8. The device of claim 1, wherein the second media content is of a same genre as the first media content.

9. The device of claim 1, wherein the set of content comprises a plurality of media content items, and wherein the operations further comprise:
   accessing a plurality of favorability ratings for the plurality of media content items; and
   weighting the similarity score according to the favorability ratings.

10. The device of claim 1, wherein the operations further comprise:
    scanning a plurality of training images of a plurality of training media content associated with the viewer to detect a plurality of visual training image objects present within the plurality of training images;
    comparing training images of the plurality of training images to identify a plurality of training generative visual features and a plurality of training discriminative visual features with respect to combinations of the training media content; and
    generating a model of correlated image objects according to the plurality of training generative visual features and the plurality of training discriminative visual features.

11. A non-transitory machine-readable medium comprising executable instructions that, when executed by a processing system including a processor, facilitate performance of operations comprising:
    determining a first set of image objects in first images of first media content, wherein the first set of image objects are generated by filtering a first catalog of image objects scanned from the first media content using first criteria, wherein the first criteria comprise a number of occurrences of an image object, a running time of occurrence of the image object, or a combination thereof;
    generating a similarity score by processing the first set of image objects with a similarity model derived by identifying generative visual features and discriminative visual features scanned from second media content using second criteria, wherein the second media content is determined to be favored by a viewer, wherein the second media content is selected from a set of content being viewed by the viewer within a time period;
    providing the similarity score for predicting a response from equipment of the viewer regarding the first media content; and
    generating a recommendation for the first media content according to the similarity score.

12. The non-transitory machine-readable medium of claim 11, wherein one or both of the first criteria and the second criteria include information from a viewer profile.

13. The non-transitory machine-readable medium of claim 11, wherein the operations further comprise training the similarity model using a hierarchy of features of the second audio visual content.

14. The non-transitory machine-readable medium of claim 11, wherein the set of content comprises a plurality of media content items, and wherein the operations further comprise:
    accessing a plurality of favorability ratings for the plurality of media content items; and
    weighting the similarity score according to the favorability ratings.

15. The non-transitory machine-readable medium of claim 11, wherein the operations further comprise:
    scanning a plurality of training images of a plurality of training media content associated with the viewer to detect a plurality of visual training image objects present within the plurality of training images;
    comparing training images of the plurality of training images to identify a plurality of training generative visual features and a plurality of training discriminative visual features with respect to combinations of the training media content; and generating a model of correlated image objects according to the plurality of training generative visual features and the plurality of training discriminative visual features.

16. A method comprising:

determining, by a processing system including a processor, a first set of image objects in first images of first media content, wherein the first set of image objects are generated by filtering a first catalog of image objects scanned from the first media content using first criteria, wherein the first criteria comprise a number of occurrences of an image object, a running time of occurrence of the image object, or a combination thereof;

generating, by the processing system, a similarity score by processing the first set of image objects with a similarity model derived by identifying generative visual features and discriminative visual features scanned from second media content using second criteria, wherein the second media content is determined to be favored by a viewer, wherein the second media content is selected from a set of content being viewed by the viewer within a time period, and wherein one or both of the first criteria and the second criteria include information from a viewer profile;

providing, by the processing system, the similarity score for predicting a response from equipment of the viewer regarding the first media content; and generating, by the processing system, a recommendation for the first media content according to the similarity score.

17. The method of claim 16, further comprising receiving, by the processing system, an indication of a viewing decision responsive to the recommendation.

18. The method of claim 16, further comprising training, by the processing system, the similarity model using a hierarchy of features of the second audio visual content.

19. The method of claim 16, wherein the set of content comprises a plurality of media content items, and further comprising:

accessing, by the processing system, a plurality of favorability ratings for the plurality of media content items; and weighting, by the processing system, the similarity score according to the favorability ratings.

20. The method of claim 16, further comprising:

scanning, by the processing system, a plurality of training images of a plurality of training media content associated with the viewer to detect a plurality of visual training image objects present within the plurality of training images;

comparing, by the processing system, training images of the plurality of training images to identify a plurality of training generative visual features and a plurality of training discriminative visual features with respect to combinations of the training media content; and generating, by the processing system, a model of correlated image objects according to the plurality of training generative visual features and the plurality of training discriminative visual features.

* * * * *